(12) United States Patent
Werner

(10) Patent No.: US 8,356,618 B1
(45) Date of Patent: Jan. 22, 2013

(54) WATER SEPARATOR FOR SMALL BOAT FUEL SYSTEMS

(76) Inventor: Todd C. Werner, Clearwater, FL (US)

(*) Notice: Subject to any disclaimer, the term of this patent is extended or adjusted under 35 U.S.C. 154(b) by 359 days.

(21) Appl. No.: 12/427,363

(22) Filed: Apr. 21, 2009

(51) Int. Cl.
B10D 17/02 (2006.01)
(52) U.S. Cl. .................. 137/172; 137/571; 137/581
(58) Field of Classification Search .......... 137/172, 137/590, 571–576, 581, 565.17; 210/171, 210/172.1, 532.1, 172.2–172.4, 416.4, 799, 210/513, 801, 800, 242.1; 440/88 F, 89 F; 114/55.51, 55.5; 222/465.1
See application file for complete search history.

(56) References Cited

U.S. PATENT DOCUMENTS

| | | | | |
|---|---|---|---|---|
| 963,322 | A * | 7/1910 | Purdy | 137/571 |
| 2,751,084 | A * | 6/1956 | Wilhelm | 210/172.6 |
| 3,158,193 | A * | 11/1964 | Anderson | 137/411 |
| 3,188,974 | A * | 6/1965 | Rosaen | 210/172.1 |
| 3,396,748 | A * | 8/1968 | Hatakeyama Hiroyuki et al. | 137/587 |
| 3,409,040 | A * | 11/1968 | Weston et al. | 137/572 |
| 4,594,970 | A * | 6/1986 | Baars et al. | 123/73 AD |
| 4,595,030 | A * | 6/1986 | Yazaki | 137/590 |
| 4,716,931 | A * | 1/1988 | Shibamoto | 137/590 |
| 4,795,556 | A * | 1/1989 | Brotea et al. | 210/172.1 |
| 5,662,089 | A * | 9/1997 | Kleppner et al. | 137/576 |
| 6,138,853 | A * | 10/2000 | Frechette | 440/88 F |
| 6,244,915 | B1 * | 6/2001 | Ozawa | 440/88 F |
| 6,444,121 | B1 * | 9/2002 | Maxwell | 210/172.1 |
| 6,540,926 | B2 * | 4/2003 | Goodrich | 210/801 |
| 6,872,109 | B2 * | 3/2005 | Nagata et al. | 440/88 F |
| 7,112,110 | B1 * | 9/2006 | Kollmann | 440/88 F |
| 7,306,715 | B2 * | 12/2007 | Kato et al. | 210/416.4 |
| 7,485,219 | B2 * | 2/2009 | Urbahn et al. | 210/172.2 |
| 7,753,545 | B2 * | 7/2010 | Groover | 222/113 |
| 2005/0199222 | A1 * | 9/2005 | Ekstam | 123/514 |
| 2005/0252847 | A1 * | 11/2005 | Urbahn et al. | 210/416.4 |
| 2010/0154727 | A1 * | 6/2010 | Malgorn et al. | 210/172.1 |

* cited by examiner

*Primary Examiner* — Craig Schneider
*Assistant Examiner* — Craig J Price
(74) *Attorney, Agent, or Firm* — Ronald E. Smith; Smith & Hopen, P.A.

(57) ABSTRACT

A portable fuel tank includes a recess formed in a top wall that accommodates a fuel/water separator canister. The canister includes an inlet in fluid communication with liquid fuel in the enclosure and an outlet in fluid communication with a motor. The canister retains water separated from the fuel. A fuel intake tube is disposed within the tank and a fuel inlet conduit is disposed externally of the tank. The fuel inlet conduit has a first end in fluid communication with the fuel intake tube and a second end in fluid communication with an inlet of the canister. A manifold includes a first branch providing fluid communication between the fuel inlet conduit and the canister inlet and a second branch providing fluid communication between the canister outlet and a fuel outlet conduit that supplies water-free fuel to a motor.

4 Claims, 3 Drawing Sheets

WATER SEPARATOR FOR SMALL BOAT FUEL SYSTEMS

FIELD OF THE INVENTION

This invention relates, generally, to fuel delivery systems. More particularly, it relates to a small, portable fuel tank equipped with a filter for removing water from fuel.

DESCRIPTION OF THE PRIOR ART

Contamination of the fuel source is a common problem with marine engine fuel systems. Water that collects in the boat's fuel tank is the most common source of contamination.

The fuel for most small boats is kept in a portable plastic fuel tank that is secured to the deck of the boat by any suitable means. These well-known plastic fuel tanks have no means for separating water from fuel.

Fuel/water separator canisters are usually mounted on bulkheads of those watercraft sufficiently large to have space for bulkheads. Accordingly, most large boats do not rely on portable plastic fuel tanks and do not have the problem of fuel contamination by water. The bulkhead-mounted canisters are changed on a regular schedule or as needed by unscrewing a canister from a manifold and replacing it with a new one.

Conventional portable fuel tanks found in most small boats include a small inline fuel filter that traps solid and semi-solid materials and therefore protects the motor from such materials. There is no practical means, however, for separating the water from the fuel in these systems because there is no room for a bulkhead into which a fuel/water separator system and canister can be mounted.

Portable tanks usually have a capacity of six to twelve gallons in capacity and typically include a lifting handle, a threaded filler cap with a built-in fuel level sensor, a vent, and a quick release coupler for connecting a fuel supply line to the motor.

Thus there is a need for a means for separating water from fuel that can be used with portable plastic fuel tanks on small boats.

There is also a need for such a means that does not require additional space on a boat.

However, in view of the prior art taken as a whole at the time the present invention was made, it was not obvious to those of ordinary skill how the identified needs could be fulfilled.

SUMMARY OF THE INVENTION

The long-standing but heretofore unfulfilled need for an apparatus that separates water from fuel and that can be used in connection with portable plastic fuel tanks on boats that lack room for conventional fuel/water separator canisters of the type conventionally mounted on bulkheads is now met by a new, useful, and non-obvious invention.

The inventive structure includes all of the features found in conventional portable plastic fuel tanks, and adds a recess molded into the top of a conventional tank adapted to accept a fuel/water separator canister of the same size and shape found on larger boats.

The fuel/water separator canister is slip fit into the novel recess molded into the top of the fuel tank. A manifold and other plumbing is attached to the canister. Accordingly, no permanent mounting to the boat is required. The size and volumetric capacity of the tank remain substantially the same even though the tank has a recess molded into it because the canister holds about the same amount of fuel displaced by the recess. Replacement of the canister requires slideably lifting the used canister out of the recess, disconnecting it from the manifold, connecting a new canister to the manifold, and inserting the new canister into the molded recess.

More particularly, the novel fuel tank includes a hollow, integrally formed enclosure having a generally parallelepiped structure having a top wall, a bottom wall, a forward wall, a rear wall, and a pair of side walls. A recess formed in the top wall is adapted to slidingly receive a conventional fuel/water separator canister therein. The recess includes a floor plate disposed in substantially parallel relation to the top wall of the enclosure, spaced vertically downward from the top wall and vertically upward from the bottom wall of the enclosure. The recess includes a recess side wall mounted about the periphery of the floor plate and projecting upwardly therefrom. The annular uppermost end of the recess side wall is formed integrally with the top wall of the fuel tank.

The fuel/water separator canister includes a fuel inlet tube adapted for fluid communication with liquid fuel housed within the enclosure and a fuel outlet conduit adapted for fluid communication with a motor. The motor is adapted to receive fuel from the fuel outlet conduit and the fuel/water separater canister is adapted to retain water separated from the fuel.

The fuel intake tube is disposed within a hollow interior of the fuel tank and a fuel inlet conduit is disposed externally of the fuel tank in fluid communication with said fuel intake tube. The fuel inlet conduit has a first end in fluid communication with the fuel intake tube and a second end in fluid communication with an inlet of the canister.

The fuel/water separator canister includes a manifold having a first branch that provides fluid communication between the fuel inlet conduit and the inlet of the canister and a second branch that provides fluid communication between the outlet of the canister and the fuel outlet conduit.

An annular canister-supporting wall is mounted about the periphery of the recess formed in the top wall of the portable fuel tank and projects upwardly therefrom. It supports the canister about an overhang formed by the canister manifold and a main body of the canister.

An object of this invention is to enable installation of a fuel/water separator system of the type found on larger boats with built-in fuel tanks onto a small boat having a portable fuel tank.

A closely related object is to modify a portable fuel tank so that it can accommodate a fuel/water separator system without displacing an unacceptable amount of fuel.

Another important object is to provide the improved fuel tank with the fuel/water separator system and associated plumbing or tubing without substantially enlarging the fuel tank so that it can fit into a small space occupied by unmodified prior art plastic, portable fuel tanks.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
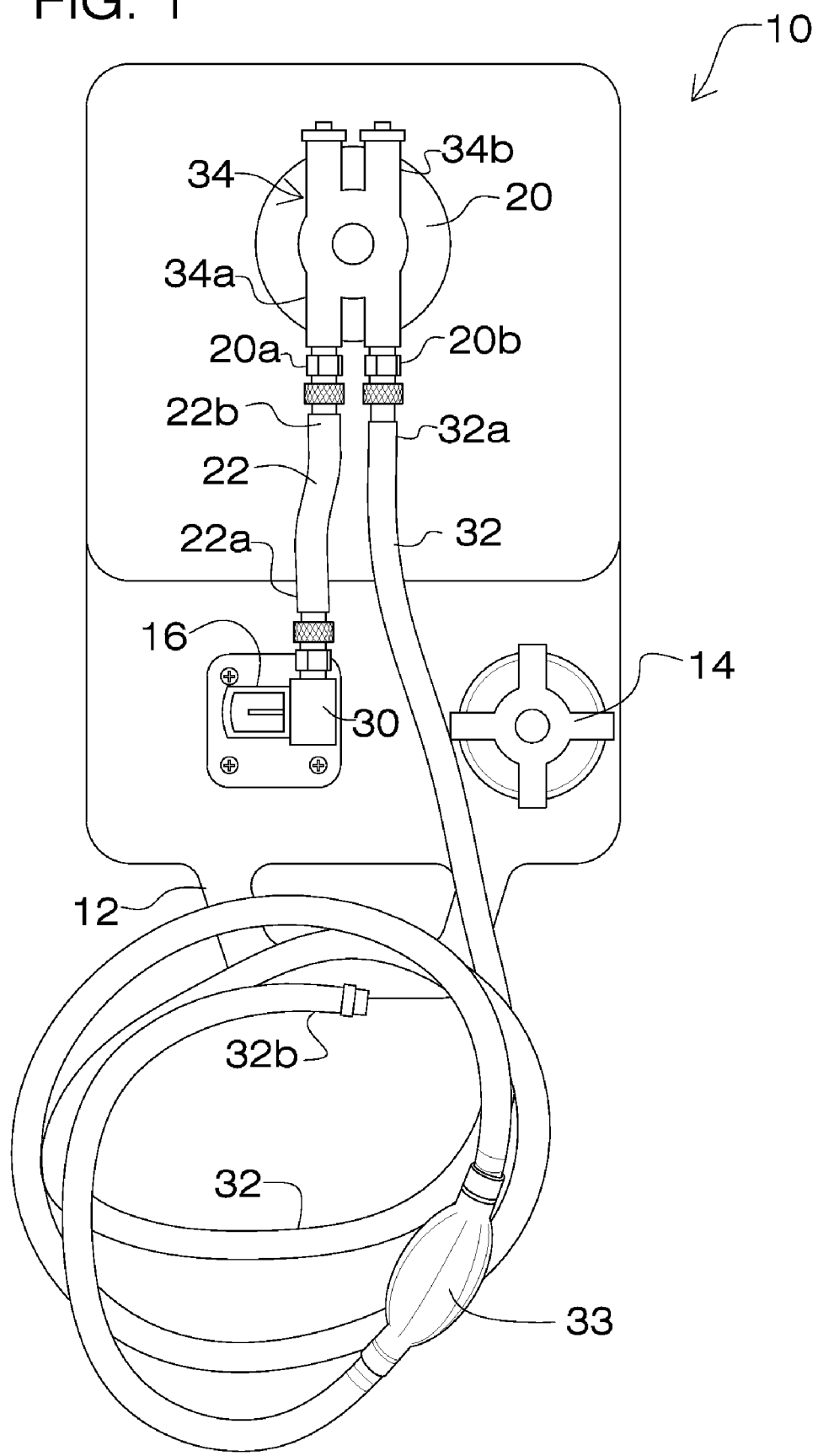
FIG. 1 is a top plan view of the preferred embodiment.
Figure 2:
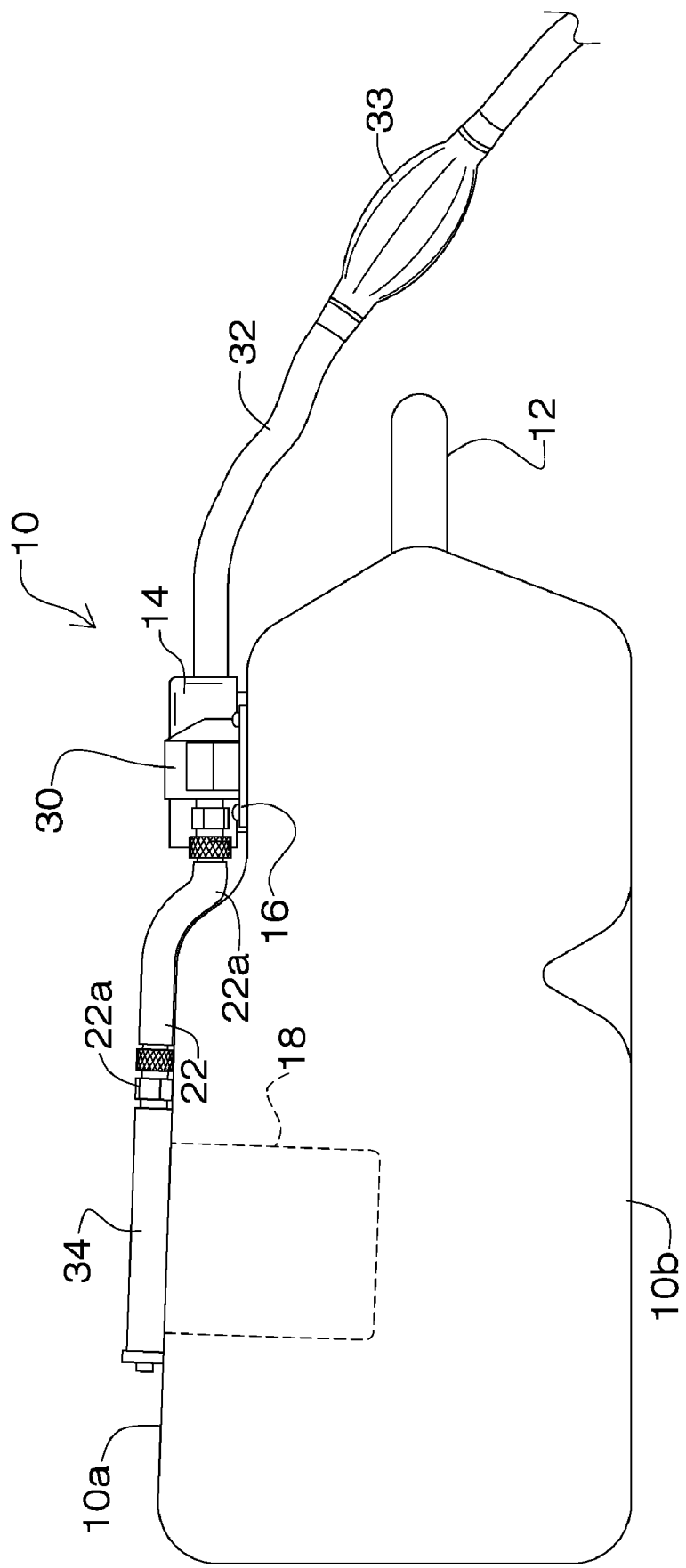
FIG. 2 is a side elevational view thereof.
Figure 3:
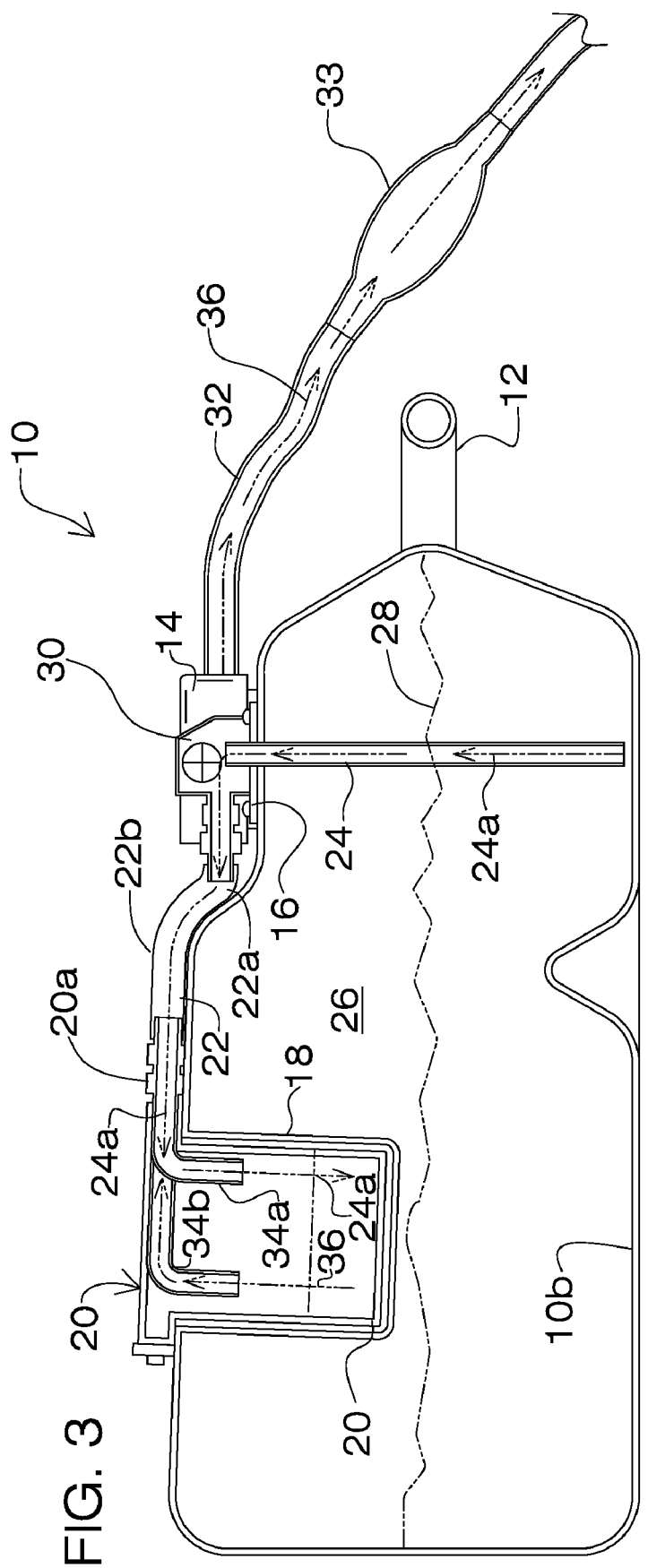
FIG. 3 is a sectional view thereof.

Referring now to FIGS. 1-3, it will there be seen that the novel portable plastic fuel tank is denoted as a whole by the reference number 10.

It includes conventional handle 12, conventional fuel fill cap 14, and conventional fuel level sensor 16.

Recess 18 is molded into top wall of tank wall 10a of tank 10 as best depicted in FIG. 3 and is new. The recess 18 comprises an imperforate floor and imperforate walls. It is sized and shaped to slidingly receive conventional fuel/water separator canister 20. In the claims that follow, recess 18 is referred to as a canister housing. Fuel inlet conduit 22 is generally horizontally disposed when fuel tank 10 is in its operative position as depicted in FIGS. 2 and 3 and is in fluid communication with fuel intake tube 24 that is vertically disposed almost completely within the hollow interior 26 of fuel tank 10. Note that fuel inlet conduit 22 abuts fuel tank 10 to conserve space.

The lowermost end of intake tube 24 is positioned just slightly above bottom wall 10b of tank 10 in a well-known way so that it can take up fuel 28 even when fuel tank 10 is almost empty. The uppermost end of fuel intake tube 24 is external to the fuel tank and is in fluid communication with fuel inlet conduit 22.

More particularly, a suitable elbow connector 30 provides a ninety degree (90°) connection between first end 22a of fuel inlet conduit 22 and the uppermost end of fuel intake tube 24.

Second end 22b of fuel inlet conduit 22 is connected to inlet 20a of canister 20. In a prior art fuel tank, second end 22b would be connected to the fuel inlet connection of a motor.

As depicted in FIG. 3, fuel 28 flows upwardly through fuel intake tube 24 as indicated by directional arrows 24a, and flows into canister 20 though fuel inlet conduit 22 as also indicated by said directional arrows 24a. Canister 20 includes a fuel/water separator filter that separates water from the fuel that is routed to the motor through fuel outlet conduit 32.

A first end 32a of fuel outlet conduit 32 is connected to outlet 20b of canister 20 and a second end 32b (FIG. 1) of said fuel outlet conduit is connected to the fuel inlet connection of a motor. Primer bulb 33 in said fuel outlet conduit 32 is conventional. Fuel outlet conduit 32 also abuts fuel tank 10 where possible to conserve space.

More particularly, canister 20 includes manifold 34 and said manifold has branches 34a and 34b. Fuel inlet conduit 22 is in fluid communication with branch 34a as best understood in connection with FIG. 3 and fuel outlet conduit 32 is in fluid communication with branch 34b.

Fuel that may be contaminated with water thus flows into canister 20 through manifold branch 34a as indicated by directional arrows 24a and fuel from which water has been removed by canister 20 flows into manifold branch 34b and to a motor, not depicted, as indicated by directional arrows 36.

Canister 20 is replaced with a new canister when the canister in use is filled or nearly filled with water or it may be replaced as a part of regularly scheduled maintenance. Canister 20 is not a part of the invention per se.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A small boat fuel tank that supplants a pre-existing portable, small boat fuel tank, comprising:
   a portable, hollow, modified fuel tank having a generally parallelepiped structure including a top wall and a bottom wall, said modified fuel tank having a fuel-holding capacity substantially equal to a fuel-holding capacity of said pre-existing, portable small boat fuel tank;
   an independently formed fuel/water separator canister;
   a canister housing formed in said top wall, said canister housing adapted to receive said independently formed fuel/water separator canister therein;
   said canister housing including an imperforate floor disposed in substantially parallel relation to said top wall, spaced vertically downward from said top wall and vertically upward of said bottom wall;
   said canister housing including imperforate side walls mounted about the periphery of said imperforate floor and projecting upwardly therefrom;
   said imperforate side walls having an uppermost end formed integrally with said top wall to define a periphery of said canister housing;
   said independently formed fuel/water separator canister being disposed within said canister housing;
   said imperforate floor and side walls preventing fuel in said modified fuel tank from flowing into said canister housing through said imperforate floor and side walls;
   said independently formed fuel/water separator canister including an inlet adapted for fluid communication with liquid fuel housed within said modified fuel tank;
   said independently formed fuel/water separator canister including an outlet adapted for fluid communication with a fuel outlet conduit;
   said fuel outlet conduit adapted to receive fuel from said outlet;
   said independently formed fuel/water separator canister retaining water separated from said fuel; and
   said canister housing displacing an amount of fuel in said modified fuel tank that is substantially equal to an amount of fuel contained within said fuel/water separator canister.

2. The small boat fuel tank of claim 1, further comprising:
   a fuel intake tube having a lower end disposed within a hollow interior of said small boat fuel tank;
   a fuel inlet conduit disposed externally of said small boat fuel tank and having a first end in fluid communication with an upper end of said fuel intake tube; and
   said fuel inlet conduit having a second end in fluid communication with said inlet of said canister.

3. The small boat fuel tank of claim 2, further comprising:
   said fuel outlet conduit disposed externally of said small boat fuel tank and having a first end in said fluid communication with said outlet of said independently formed fuel/water separator canister.

4. The fuel tank of claim 2, further comprising:
   a manifold forming a part of said independently formed fuel/water separator canister;
   said manifold including a first branch providing fluid communication between said fuel inlet conduit and said inlet of said independently formed fuel/water separator canister;
   said manifold including a second branch providing fluid communication between said outlet of said independently formed fuel/water separator canister and said fuel outlet conduit.

\* \* \* \* \*